June 6, 1933.  F. KUBLER  1,912,530
POULTRY FOUNTAIN
Filed Jan. 18, 1933
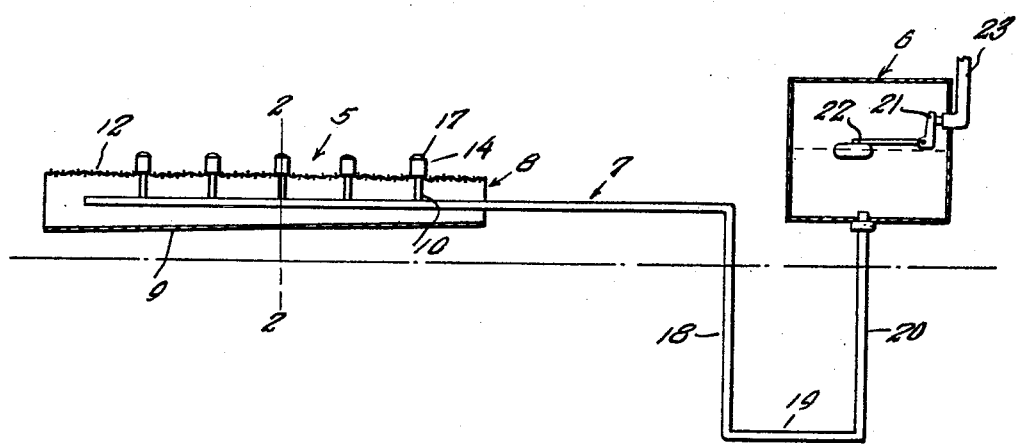
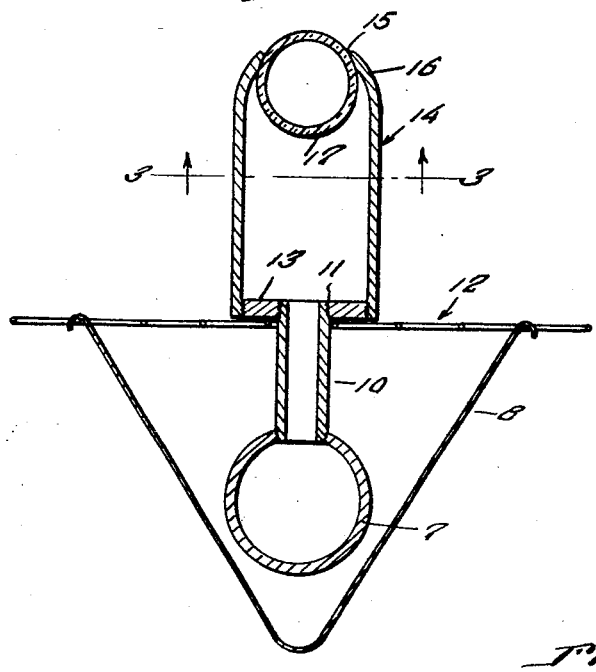
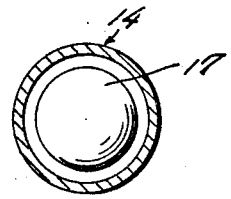
Inventor
Fred Kubler
By Clarence A. O'Brien
Attorney Patented June 6, 1933

1,912,530

UNITED STATES PATENT OFFICE

FRED KUBLER, OF VAN NUYS, CALIFORNIA

POULTRY FOUNTAIN

Application filed January 18, 1933. Serial No. 652,392.

My invention relates generally to poultry fountains, and particularly to a sanitary poultry fountain in the use of which the poultry are prevented from falling in the water supplied thereby or submerging therein more than their beaks, so that the poultry are protected against contamination and the catching of colds and other diseases which would otherwise attack them through the various passages in their heads.

It is an important object of my invention to provide a sanitary poultry fountain of the type described above wherein is incorporated automatic gravity feeding means for supplying the water to automatically controlled outlets operable by the poultry, the level of water supply being controlled by float means.

It is also an important object of my invention to provide outlet means operable by the poultry arranged so that upon operation thereof the beaks of the poultry will be cleaned by a rush of water before the poultry have begun to drink, so that contamination of the poultry by immersion of the beak in the water thereof or by contact of the beak with structural parts thereof is prevented.

It is also an important object of my invention to provide a device of the character described above wherein the water is constantly ready to be used by the poultry and is not wasted when not being used.

Another object of my invention is to provide in a device of the character described, structure which is readily manufactured, is low in cost, and is susceptible of easy replacement and repair and maintenance in sanitary condition by reason of the ease with which it may be cleaned, and the extent to which it is self cleaning.

Other objects and advantages of my invention will be apparent from a reading of the following description in connection with the drawing, wherein for purposes of illustration I have shown a preferred embodiment of my invention.

In the drawing:—

Figure 1 is a longitudinal vertical sectional view through a unit constructed in accordance with my invention.

Figure 2 is a transverse vertical sectional view taken through Figure 1 approximately on the line 2—2.

Figure 3 is a horizontal sectional view taken through Figure 2 approximately on the line 3—3 and looking upwardly in the direction of the arrows.

Referring in detail to the drawing, wherein like numerals refer to like parts throughout the same, the device of the invention comprises the fountain portion 5 and the water supply container 6, the fountain portion 5 and the water container portion 6 being connected by a fluid conduit 7. The portions described may be located at or close to the ground level, being disposed slightly above or slightly below the ground level as may be found convenient in the particular application of the invention under discussion.

The fountain portion 5 comprises a trough 8 which is preferably of metal and has a V-shaped cross section illustrated in Figure 2. The trough 8 may be supported in any suitable manner and may be open at both ends. The trough 8 has an inclined bottom 9 for gravitationally conveying away waste water falling therein. Extending longitudinally and centrally of the trough and spaced therefrom in all directions is the pipe 7 which has at longitudinally spaced points thereon upwardly projecting nipples 10 which are threaded into threaded openings in the upper side of the pipe 7.

Threaded upper ends 11 of the nipples 10 project above a horizontal wire screen 12 which is placed across the top of the trough 8 for keeping out the poultry and constituting a floor for the poultry to stand upon when drinking.

Just above the screen 12 and threaded on the upper end of the nipples 10 is a plate 13 having threaded edges. The plate 13 is threaded into the lower end of a vertically elongated hollow cylindrical form 14 which has a reduced opening 15 in its upper end constituted by a curved converging of the upper end portions of the sides as indicated at 16. Within the cylinder 14 and of a size to be confined against escaping from the cylinder 14 is a glass or other similar material hollow ball 17. The ball is of a size to project a portion thereof through and beyond the opening 15 at the upper end of the cylinder 14, so that the ball may be easily contacted by the beak of the poultry.

The pipe 7 leads from one end of the trough 8 and at some distance from the trough it has a depending portion 18 on whose lower end extends laterally the horizontal portion 19 at the end of which rises a vertical portion 20 which is suitably entered into the bottom of the water supply tank 6. The water supply tank 6 has suitably mounted therein on a fitting 21 a rockable float 22. A water supply conduit 23 passes through one side of the container 6 and connects with the fitting 21 for supplying the tank 6 with water. The float 22 acts in conjunction with the fitting 21 for closing off the supply conduit 23 when a predetermined level of water has been created within the container 6. The water in the container 6 falls by gravity through the various portions of the conduit 7 and the outer end of the conduit 7 being closed, the water will rise through the nipples 10 into the cylinders 14 and cause the glass balls 17, which are buoyant, to rise in the cylinders 14 and close the openings 15 in the upper ends of the cylinders and prevent escape and waste of the water.

However, as soon as a chicken presses its beak against the ball 17, the ball 17 will be depressed so as to open the opening 15 and permit a rush of water therefrom which cleans the beak of the chicken of the contaminating matter referred to. As the water comes through the opening 15 the chicken is enabled to fill its beak. As soon as the chicken removes its beak from the ball 17, the ball will rise and close the opening 15 and prevent waste of water except that which performs the cleansing function mentioned and that which is drunk by the chicken.

It will be observed that the level controlled by the float 22 in the container 6 is above the upper ends of the cylinder 14 to produce the necessary rise of water through the cylinders 14 and cause the water to issue through the opening 15 with the desired force and speed.

Though I have shown and described herein a preferred embodiment of my invention, it is to be definitely understood that I do not desire to limit the application of the invention thereto, and any change or changes may be made in material and structure and arrangement of parts, within the spirit of the invention and the scope of the subjoined claims.

It will be observed that any dirt dropped from the bird's beak will be thrown by the issuing water from the cylinder and ball into the trough, so that the water supply is always clean.

What is claimed is:—

A poultry fountain comprising a water supply container, level maintaining means within the container, controlled outlet means, and conduit means connecting the container with the outlet means, said outlet means being located at a level below the level of water in the container, and a waste water receiving member under the outlet means, each of said means comprising a water confining member on the conduit, a buoyant member within the water confining member, said water confining member being provided with an opening which the buoyant member normally closes, said buoyant member being adapted to be depressed for causing issue of water from the opening.

In testimony whereof I affix my signature.

FRED KUBLER.